US007996425B1

(12) United States Patent  (10) Patent No.: US 7,996,425 B1
Chien  (45) Date of Patent: Aug. 9, 2011

(54) STORING ELEMENT-BASED DESCRIPTIONS OF DOCUMENTS IN A DATABASE

(75) Inventor: Shu-Yao Chien, Los Angeles, CA (US)

(73) Assignee: Teradata US, Inc., Dayton, OH (US)

( * ) Notice: Subject to any disclaimer, the term of this patent is extended or adjusted under 35 U.S.C. 154(b) by 276 days.

(21) Appl. No.: 12/431,405

(22) Filed: Apr. 28, 2009

Related U.S. Application Data

(63) Continuation of application No. 10/440,868, filed on May 19, 2003, now Pat. No. 7,562,081.

(51) Int. Cl.
*G06F 17/30* (2006.01)
(52) U.S. Cl. ........................................ 707/786; 707/802
(58) Field of Classification Search .................. 707/786, 707/802
See application file for complete search history.

(56) References Cited

U.S. PATENT DOCUMENTS

| | | | |
|---|---|---|---|
| 6,763,499 B1 * | 7/2004 | Friedman et al. | 715/240 |
| 6,941,510 B1 * | 9/2005 | Ozzie et al. | 715/234 |
| 7,072,896 B2 * | 7/2006 | Lee et al. | 1/1 |
| 7,562,081 B2 * | 7/2009 | Chien | 1/1 |
| 2002/0029211 A1 * | 3/2002 | Bonner et al. | 707/3 |
| 2002/0078094 A1 * | 6/2002 | Krishnaprasad et al. | 707/513 |
| 2004/0024737 A1 * | 2/2004 | Fish | 707/1 |
| 2004/0220912 A1 * | 11/2004 | Manikutty et al. | 707/3 |
| 2004/0225673 A1 * | 11/2004 | Beck et al. | 707/102 |
| 2006/0236222 A1 * | 10/2006 | Marmigere et al. | 715/513 |

* cited by examiner

*Primary Examiner* — Cheryl Lewis
(74) *Attorney, Agent, or Firm* — Howard Speight

(57) ABSTRACT

A method, computer program, and database system are disclosed for storing element-based descriptions of documents in a database. The database system includes one or more nodes. Each of the one or more nodes provides access to one or more of a plurality of CPUs. Each of the one or more CPUs provides access to one or more of a plurality of virtual processes. Each virtual process is configured to manage data stored in one of a plurality of data-storage facilities. The data stored in the plurality of data-storage facilities includes data representing a database table. A row of the table corresponds to an element of the element-based document description and includes: data describing the element, an order identifier corresponding to the element, and a range identifier corresponding to the element.

20 Claims, 4 Drawing Sheets

FIG. 2

| PRODUCT ID | NAME | PRICE |
|---|---|---|
| 10001 | Widget | 199.00 |
| 10002 | Super Widget | 299.00 |
| 10003 | Premium Widget | 399.00 |

FIG. 3

```
<?xml version="1.0"?>
<products>
    <product id="10001">
        <name>Widget</name>
        <price>199.00</price>
    </product>
    <product id="10002">
        <name>Super Widget</name>
        <price>299.00</price>
    </product>
    <product id="10003">
        <name>Premium Widget</name>
        <price>399.00</price>
    </product>
</products>
```

FIG. 4

| PRODS | PRODS ORDER | PRODS RANGE |
|---|---|---|
| PRODUCTS | 1 | 100 |

FIG. 5

| PROD ORDER | PROD RANGE | ID | ID ORDER | ID RANGE | NAME | NAME ORDER | NAME RANGE | PRICE | PRICE ORDER | PRICE RANGE |
|---|---|---|---|---|---|---|---|---|---|---|
| product 10 | 20 | 10001 | 12 | 1 | Widget | 15 | 5 | 199.00 | 25 | 2 |
| product 40 | 20 | 10002 | 42 | 1 | Super Widget | 45 | 5 | 299.00 | 55 | 2 |
| product 70 | 20 | 10003 | 72 | 1 | Premium Widget | 75 | 5 | 399.00 | 85 | 2 |

FIG. 6

| TAG | TABLE | COLUMN |
|---|---|---|
| products | T1 | Prods |
| product | T2 | Prod |
| id | T2 | ID |
| name | T2 | Name |
| price | T2 | Price |

STORING ELEMENT-BASED DESCRIPTIONS OF DOCUMENTS IN A DATABASE

RELATED CASE

This application is a continuation of co-owned application Ser. No. 10/440,868, now U.S. Pat. No. 7,562,081 filed on May 19, 2003.

BACKGROUND

Element-based descriptions of documents can be found in descriptions prepared in accordance with particular markup languages. For example, the Standard Generalized Markup Language (SGML) was developed and adopted by the International Standards Organization (ISO) in 1986. Another example, the eXtensible Markup Language (XML), also defines rules for describing documents using elements. XML is used currently to define many documents to which access is provided over the Internet.

When a document is described in terms of elements, whether in accordance with SGML, XML, or using a non-standard approach, the elements are often related to one another in a manner beyond sequence. For example, while a document might consist of only a list of paragraph elements without any other structure, many documents will also include chapters, into which paragraphs are grouped. As an example, a chapter element may include a title element and a number of paragraph elements. The title and paragraph elements are each nested within the chapter element because they begin and end after the chapter element begins, but before it ends.

Databases are used to store and retrieve information. One type of information that can be stored is element-based document descriptions. For example, a database user may desire to store all the XML documents that are located on a website. The independent elements of the XML document, by themselves, do not contain the same information as the XML document because the sequential and nesting relationships between the elements are information included in the XML document. It is useful to store the relationship information in a database in addition to the information concerning the individual elements.

SUMMARY

In general, in one aspect, the invention features a database system for storing an element-based document description. The database system includes one or more nodes. Each of the one or more nodes provides access to one or more of a plurality of CPUs. Each of the one or more CPUs provides access to one or more of a plurality of virtual processes. Each virtual process is configured to manage data stored in one of a plurality of data-storage facilities. The data stored in the plurality of data-storage facilities includes data representing a database table. A row of the table corresponds to an element of the element-based document description and includes: data describing the element, an order identifier corresponding to the element, and a range identifier corresponding to the element.

Implementations of the invention may include one or more of the following. For each other element in the element-based document description, a database row can be stored that includes data describing the element, an order identifier corresponding to the element, and a range identifier corresponding to the element. The element-based document description can be an XML document. The range identifier for the specified element can be a number that, when added to the order identifier for the specified element, results in a sum that is greater than the order identifier of the last element nested within the specified element, but less than the order identifier of the element thereafter. The order identifiers can be sparse in that consecutive elements have nonconsecutive order identifiers.

In general, in another aspect, the invention features a computer program for storing an element-based document description. The program include executable instructions that cause a computer to perform the following steps. Data describing an element of the element-based document description is stored in a row of a database table. An order identifier corresponding to the element is stored in the row. A range identifier corresponding to the element is stored in the row.

In general, in another aspect, the invention features a method for storing an element-based document description. Data describing an element of the element-based document description is stored in a row of a database table. An order identifier corresponding to the element is stored in the row. A range identifier corresponding to the element is stored in the row.

BRIEF DESCRIPTION OF THE DRAWINGS

FIG. 2 is a product table.

FIG. 3 is an XML document that describes the product table of FIG. 2.

FIG. 4 is a first table including a row corresponding to an element of the XML document of FIG. 3.

FIG. 5 is a second table including rows corresponding to elements of the XML document of FIG. 3.

FIG. 6 is a tag side table including rows corresponding to tags of the XML document of FIG. 3.

DETAILED DESCRIPTION

Figure 1:
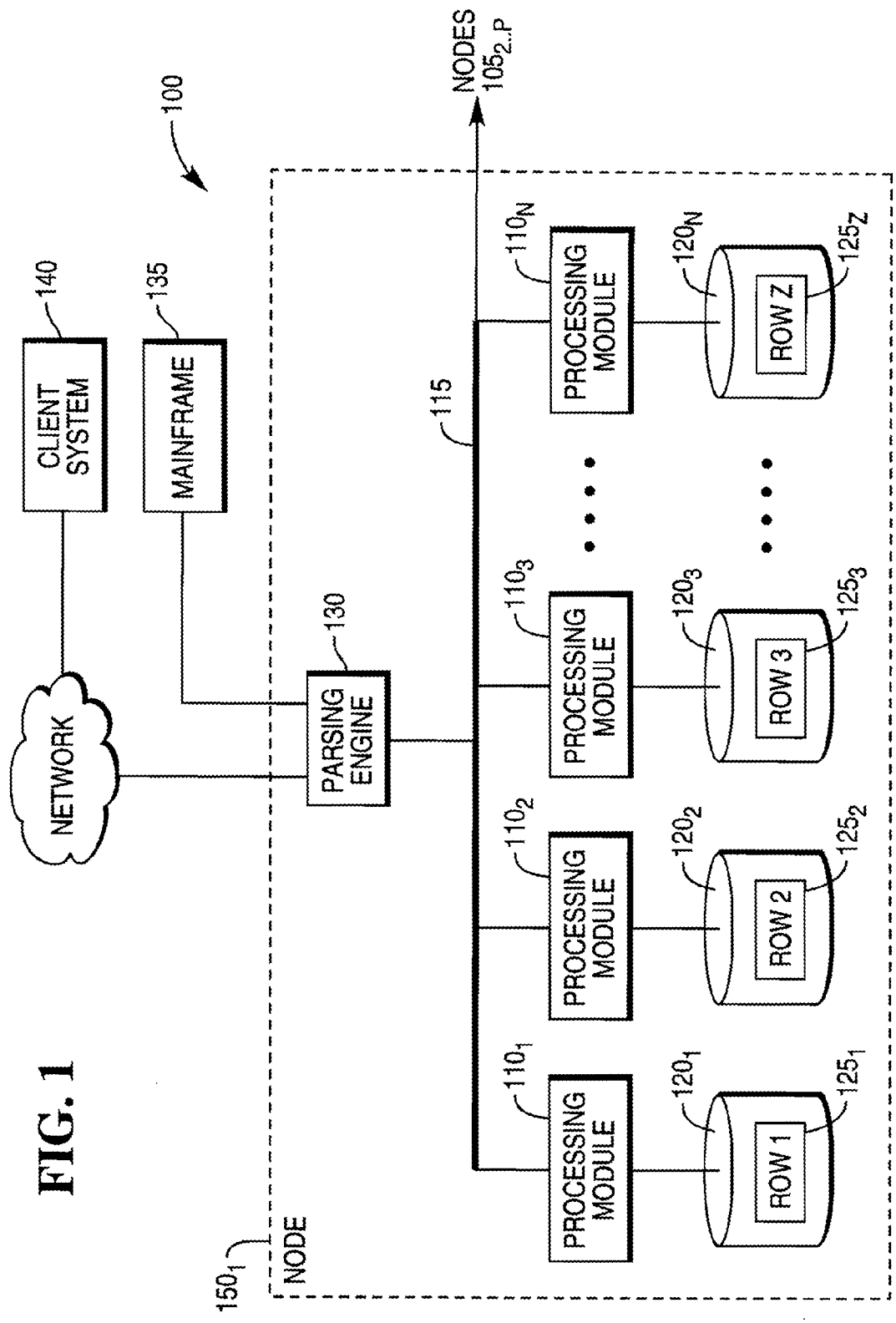
FIG. 1 is a block diagram of a node of a parallel processing database system.

The element-based document description storage technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_1 \ldots _N$ manages a portion of a database that is stored in a corresponding one of the data-storage facilities $120_1 \ldots _N$. Each of the data-storage facilities $120_1 \ldots _N$ includes one or more disk drives. The DBS may include multiple nodes $105_2 \ldots _N$ in addition to the illustrated node $105_1$, connected by extending the network 115.

The system stores data in one or more tables in the data-storage facilities $120_1 \ldots _N$. The rows $125_1 \ldots _Z$ of the tables are stored across multiple data-storage facilities $120_1 \ldots _N$ to ensure that the system workload is distributed evenly across the processing modules $110_1 \ldots _N$. A parsing engine 130 organizes the storage of data and the distribution of table rows $125_1 \ldots _Z$ among the processing modules $110_1 \ldots _N$. The parsing engine 130 also coordinates the retrieval of data from the data-storage facilities $120_1 \ldots _N$ in response to queries received from a user at a mainframe 135 or a client computer 140. The DBS 100 usually receives queries and commands to build tables in a standard format, such as SQL.

In one implementation, the rows $125_1 \ldots _Z$ are distributed across the data-storage facilities $120_1 \ldots _N$ by the parsing engine 130 in accordance with their primary index. The primary index defines the columns of the rows that are used for calculating a hash value. See discussion of FIG. 3 below for an example of a primary index. The function that produces the hash value from the values in the columns specified by the primary index is called the hash function. Some portion, possibly the entirety, of the hash value is designated a "hash bucket". The hash buckets are assigned to data-storage facilities $120_1 \ldots _N$ and associated processing modules $110_1 \ldots _N$ by a hash bucket map. The characteristics of the columns chosen for the primary index determine how evenly the rows are distributed.

FIG. 2 depicts a product table 200. The product table 200 is a documents that can be described in several ways. The product table 200 can be described by the location, font, color, etc. of each character. For example, the position of the first word 210 could be described along with its underlining. That description of each character would allow for an accurate reproduction of the table, but would not assist in any determination of the structure of the table. The table's structure includes portions associated with particular products 220, 230, 240 and further includes a name and price for each of those products. An element-based description of the product table 200 separates the table into one or more levels of elements.

FIG. 3 depicts one example element-based description 300 of the products table 200. The example follows eXtensible Markup Language or XML, which defines a format for an elements-based description of a document. Each element begins with a tag and ends with that tag preceded by a forward slash. The top level element 310 is tagged as the products element. Within that element, there are three product elements 320, 330, 340. Each product element also has associated text in the form of a designated id value. These elements can be referred to as child elements of the parent element 310. Each product element also has its own child elements. For example, the first product element 320 has two child elements: a name element 350 and a price element 355. The second product element 330 also has two child elements: a name element 360 and a price element 365. The third product element 340 also has two child elements: a name element 370 and a price element 375. Each element has characteristics including the point at which it is introduced, a value, if any, and the point at which it ends.

While the indenting used in the XML document 300 corresponds to the structure of the products table 200 and makes it easier to see, the structure could be deduced from the language. All of the product, name, and price elements are subelements of the products element 310 because they are each listed after the products element is introduced by <products> and before it ends at </products>. Similarly, name element 370 and price element 375 are subelements of product element 340 because each is listed after that product element is introduced by <product id="10001"> and before it ends at </product>.

FIG. 4 shows a database table 400 with a row 410 corresponding to the products element 310 of the XML document 300. For purposes of identification, that table shown in FIG. 4 is referred to as T1 herein. The tag name—Products—is included in the row as a description of the element. An order identifier of 1 is also included in the row in the column identified as PRODS ORDER. In another implementation, the row includes a pointer to a location container the order identifier value.

In another implementation, the order identifier of the initial element can be specified as a value greater than the lowest possible value for that field. In that case, if the XML document 300 was modified and additional elements were introduced before the Products elements 310, there would be values available to assign order identifiers to the new, additional elements that would not involve changing the order identifiers of the already-present elements. As one example, assume that the field chosen to contain the order identifiers is capable of x values. (In a digital computer, x may be some power of 2, e.g., $2^{32}$.) The order identifier of the first element could be chosen as 0.25*x and the order identifier of the last element could be chosen as 0.75*x. The order identifiers corresponding to the remaining elements could then be spread across the possible values between the first and last order identifiers. In this implementation, the order identifiers for elements that are sequential in the XML document, e.g., name 350 and price 355, would not be sequential (as long as the field has substantially more possible values than there are elements), even though the order identifiers would have the same order as their corresponding elements. By assigning sparse, but in order, order identifiers to the elements, many changes to the XML documents could be stored without the need to modify the order identifiers of the original elements, reducing the computational costs for updating the database.

In addition to the order identifier, the row 410 also includes a range identifier of 100. In another implementation, the row includes a pointer to the range identifier value. The range identifier is a value that corresponds to the portion of the element-based document description that contains subelements, if any, of the element. Several formats of range identifiers can be employed. In one implementation, the value of the range identifier corresponds to the size of the range of order identifiers following the order identifier of the current element that are subelements of the current element. With reference to FIG. 4, the Products element has an order identifier of 1 and a range identifier of 100 indicating that any element with an order identifier greater than 1 but less than 1+100 is a subelement of Products.

As another example using this approach, an element with an order identifier of 20 and a range identifier of 20 would have as subelements any elements with an order identifier greater than 20 and less than 40. In another implementation, the range identifier is the upper bound of the order identifiers corresponding to subelements. Using this format, the range identifier of the above example would be 40 rather than 20. Many other values can be used that relate to the range of subelement order identifiers by some mathematical relationship. For example, the range identifier could be set to a value that is one hundredth of the range. The top of the subelement range would then be determined by multiplying the range identifier by 100 and adding it to the order identifier.

FIG. 5 is a second table T2 including rows corresponding to elements of the XML document of FIG. 3. The elements other than the Products element are included in table. Descriptions, order identifiers, and range identifiers for multiple elements are shown in a single row. For example, the values for the product element 320, the name element 350, and the price element 355 are all included in the first row. In an alternative implementation, each element will correspond to a different row. All the elements included in table T2 have order identifiers within the range of the Products elements as identified in T1 and are therefore subelements consistent with the XML document shown in FIG. 3. In addition, each name and price element is a subelement of one of the product elements. For example, the product element described in the first row has an order identifier of 10 and a range of 20. Thus, elements with order identifiers between 10 and 30 are subelements of that product element. The name element with text of "Widget" has an order identifier of 15 and is therefore a subelement of the product element, consistent with FIG. 3. The name element has a range of 5. The price element with a value of "199.00" has an order identifier of 25, which falls within the range (10-30) of the product element, but not within the range of the name element (15-20). Therefore, consistent with FIG. 3, the price element is a subelement of the product element, but is not a subelement of the name element. The order identifier and range identifier values corresponding to the remaining elements are also consistent with the structure of the XML document in FIG. 3.

FIG. 6 is a tag side table including rows corresponding to tags of the XML document of FIG. 3. In one implementation, a table can be used to store the location of values corresponding to elements with particular tags. For example, the element with the tag—Products—corresponds to a row in table T1. Each of the remaining elements corresponds to a row in table T2. The tag side table can also identify a column in the table that corresponds to a particular tag. The tag side table can be accessed to determine the table to manipulate for information concerning elements with particular tags. In one implementation, the tag side table is not used.

Figure 7:
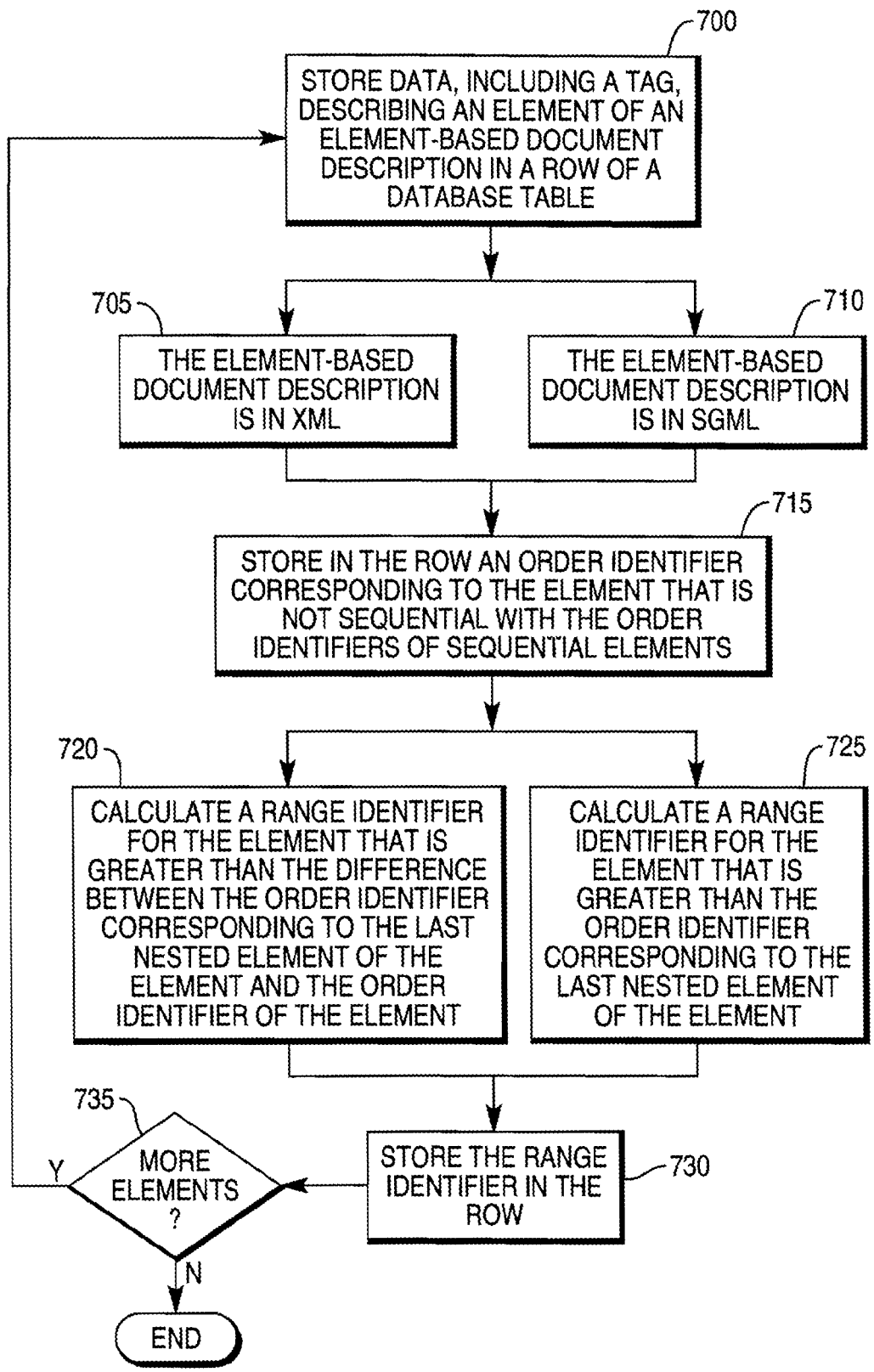
FIG. 7 is a flow chart of one method for storing an element-based document description.

FIG. 7 is a flow chart of one method for storing an element-based document description. Data is stored describing an element of an element-based document description in a row of a database table 700. The data can include the tag of the element. The element-based document description can be in XML 705 or SGML 710 format. In an alternative embodiment, neither of those formats is used. An order identifier corresponding to the element is stored in the row 715. In one implementation, sequential elements do not have sequential order identifiers. A range identifier is calculated to indicate the subelement order identifiers, if any. In one implementation, the range identifier is greater than the difference between the order identifier corresponding to the last nested element of the element and the order identifier of the element. In another implementation, the range identifier is greater than the order identifier corresponding to the last nested element of the element. The range identifier is stored in the row 730. In one implementation, if there are more elements 735, the process is repeated for those elements.

One use of the foregoing system and method is to reconstruct a document from the values contained in the database. In one implementation, the values for the elements are first retrieved from the tables. Second, the elements are ordered in accordance with their order identifiers. Finally, the range identifiers are used along with the order identifiers to accurately reconstruct the element-subelement structure of the document. In one implementation, the reconstruction is accomplished using a backward ancestor stack. The stack records the backward ancestor list for each of the elements. If the next element, is a child of the current one, it is pushed into the stack. If it is not, the stack can located to parent element, by comparing the order identifier to the ranges of the elements in the stack. For example, the following instructions implement a backward ancestor stack.

```
DocumentReconstruction(SORTED_LIST) {
    Initialize ANCESTOR_STACK as empty;
    Assign the first element of SORTED_LIST as ROOT
    and remove it from SORTED_LIST;
    Push ROOT into ANCESTOR_STACK;
    current_node = ROOT;
    For (each element,E,in SORTED_LIST from the beginning)
    {
        if ((current_node.orderID < E.orderID) and
(current_node.orderID + current_node.rangeID) >
(E.orderID + E.rangeID)) {
            Insert E as the first direct child of current_node;
            Push E into the ANCESTOR_STACK;
        }
        else {
            do {
                Pop the top element, A, from ANCESTOR_STACK and
                compare the range ((A.orderID),(A.orderID+
A.rangeID)) with ((E.orderID),(E.orderID+E.rangeID));
                if ((current_node.orderID < E.orderID) and
(current_node.orderID + current_node.rangeID) >
(E.orderID + E.rangeID)) {
                    Insert E as the next direct child of A;
                    Push A back into ANCESTOR_STACK;
                    Push E into the path_stack
                }
            } while (the parent of A is found);
        }
        Set E as the current_node for the next run;
    }
}
```

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for storing an element-based document description of a document, comprising the steps of:
   (a) storing data describing an element of the element-based document description in a row of a database table;
   (b) storing in the row an order identifier for the element, the order identifier identifying the position of the element within the document; and
   (c) storing in the row a range identifier for the element, the range identifier identifying a range of order identifiers for other elements in the element-based document description that fall hierarchically below the element in the document.

2. The method of claim 1 further comprising the step of:
   (d) performing steps (a)-(c) for each other element in the element-based document description.

3. The method of claim 1 where the order identifiers corresponding to elements in the element-based document description are not sequential for sequential elements.

4. The method of claim 1 where the range identifier is greater than the difference between the order identifier corresponding to a one of the other elements having the highest order identifier and the order identifier of the element.

5. The method of claim 1 where the range identifier is greater than the order identifier corresponding to a one of the other elements having the highest order identifier.

6. The method of claim 1 where the order identifier for a first element in the document is greater than the lowest possible value for the order identifier.

7. The method of claim 1 where the order identifier for a last element in the document is less than the highest possible value for the order identifier.

8. A computer program, stored on a computer-readable tangible storage medium, for storing an element-based document description of a document in a database system that includes database tables, the program including executable instructions that cause a computer to:
   (a) store data describing an element of the element-based document description in a row of a database table;
   (b) store in the row an order identifier for the element, the order identifier identifying the position of the element within the document; and
   (c) store in the row a range identifier for the element, the range identifier identifying a range of order identifiers for other elements in the element-based document description that fall hierarchically below the element in the document.

9. The computer program of claim 8 further comprising executable instructions that cause a computer to:
   (d) perform steps (a)-(c) for each other element in the element-based document description.

10. The computer program of claim 8 where the order identifiers corresponding to elements in the element-based document description are not sequential for sequential elements.

11. The computer program of claim 8 where the range identifier is greater than the difference between the order identifier corresponding to a one of the other elements having the highest order identifier and the order identifier of the element.

12. The computer program of claim 8 where the range identifier is greater than the order identifier corresponding to a one of the other elements having the highest order identifier.

13. The computer program of claim 8 where the order identifier for a first element in the document is greater than the lowest possible value for the order identifier.

14. The computer program of claim 8 where the order identifier for a last element in the document is less than the highest possible value for the order identifier.

15. A database system for storing an element-based document description of a document, the system comprising:
   one or more nodes;
   a plurality of CPUs, each of the one or more nodes providing access to one or more CPUs;
   a plurality of virtual processes, each of the one or more CPUs providing access to one or more virtual processes;
   each virtual process configured to manage data stored in one of a plurality of data-storage facilities; and
   where the data stored in the plurality of data-storage facilities includes data representing a database table, a row of the table corresponds to an element of the element-based document description, and that row includes:
      data describing the element;
      an order identifier corresponding to the element, the order identifier identifying the position of the element within the document; and
      a range identifier corresponding to the element, the range identifier identifying a range of order identifiers for other elements in the element-based document description that fall hierarchically below the element in the document.

16. The database system of claim 15 further comprising:
   for each other element in the element-based document description, a row that includes data describing the element, an order identifier corresponding to the element, and a range identifier corresponding to the element.

17. The computer network of claim 16 further comprising:
   a virtual process employing a backward ancestor stack to reconstruct the element-based document description from the rows containing data describing the elements, order identifiers corresponding to the elements, and range identifiers corresponding to the elements.

18. The computer network of claim 15 where the order identifiers corresponding to elements in the element-based document description are not sequential for sequential elements.

19. The computer network of claim 15 where the range identifier is greater than the difference between the order identifier corresponding to a one of the other elements having the highest order identifier and the order identifier of the element.

20. The computer network of claim 15 where the range identifier is greater than the order identifier corresponding to a one of the other elements having the highest order identifier.

* * * * *